United States Patent

Unkelbach et al.

Patent Number: 5,342,281
Date of Patent: Aug. 30, 1994

[54] APPARATUS AND METHOD FOR WET-MECHANICAL PROCESSING OF SOLIDS

[75] Inventors: Karl-Heinz Unkelbach, Cologne; Gunther Arhelger, Roesrath; Rolf Buettner, Cologne, all of Fed. Rep. of Germany

[73] Assignee: Kloeckner-Humboldt-Deutz AG, Cologne, Fed. Rep. of Germany

[21] Appl. No.: 11,287

[22] Filed: Jan. 29, 1993

[30] Foreign Application Priority Data

Jan. 31, 1992 [DE] Fed. Rep. of Germany ....... 4202778
Mar. 13, 1992 [DE] Fed. Rep. of Germany ....... 4208104

[51] Int. Cl.$^5$ ............................................. B04B 1/20
[52] U.S. Cl. ............................................. 494/53; 494/37
[58] Field of Search ................ 494/31, 50, 52, 53, 494/54, 85, 37, 51; 210/380.1, 380.3

[56] References Cited

U.S. PATENT DOCUMENTS

| | | |
|---|---|---|
| 2,528,974 | 11/1950 | Ritsch . |
| 4,037,781 | 7/1977 | High ............................ 494/51 |
| 4,339,072 | 7/1982 | Hiller ........................... 494/52 |
| 5,156,751 | 10/1992 | Miller ........................... 494/52 |

FOREIGN PATENT DOCUMENTS

| | | |
|---|---|---|
| 3210972A1 | 10/1983 | Fed. Rep. of Germany . |
| 3717847A1 | 12/1987 | Fed. Rep. of Germany . |
| 3800204A1 | 7/1989 | Fed. Rep. of Germany . |

*Primary Examiner*—Timothy F. Simone
*Assistant Examiner*—Reginald L. Alexander
*Attorney, Agent, or Firm*—Hill, Steadman & Simpson

[57] ABSTRACT

An apparatus is provided for the wet-mechanical separation of solids within a parting liquid into floats and sinks according to their density which includes a container rotatable about an axis provided with at least one opening for the admission of said solids to be separated and at least one separate opening for the discharge of the sinks, the floats and the parting liquid. A screw conveyor for separating the solids is arranged in the container. The screw conveyor is rotatable about the container axis with one set of helices for engaging the floats and another set of helices for engaging the sinks. A diaphragm plate is arranged axially on the screw conveyor between the admission opening for the solids to be separated and the discharge opening for the sinks such that one part of the screw conveyor conveys the sinks to the sinks discharge opening with its helices and another part of the screw conveyor conveys the floats to the floats discharge opening with its helices. The discharge opening for the parting liquid is arranged axially between the diaphragm plate and the discharge opening for the sinks. A radial dimension of an outside edge of the diaphragm plate from the axis of the rotatable container is greater than a radial spacing of the discharge opening from the axis.

12 Claims, 2 Drawing Sheets

APPARATUS AND METHOD FOR WET-MECHANICAL PROCESSING OF SOLIDS

BACKGROUND OF THE INVENTION

The invention is directed to an apparatus and to a method for the centrifugal wet-mechanical separation of solids based on their density using a rotating container that is provided with openings for the admission of the solids to be separated and for the discharge of the separated solids and a parting liquid, and having a rotating discharge means, such as a rotating screw conveyor, arranged in the container.

The wet-chemical separation of solids based on their density in a centrifugal field of a rotating container is disclosed in U.S. Pat. No. 2,528,974. In this known method, ores are separated based on their density in an apparatus fashioned as a centrifuge, whereby the ore is separated in a plurality of density stages between the final values of less than 4.0 g/cm$^3$ through more than 7.2 g/cm$^3$ by varying the density of the parting liquid. The centrifuge employed for this purpose comprises two oppositely coiled screw conveyors arranged on a shaft as a discharge means, these conveying the floating matter to one side and the sinks (higher density materials) to the other side of the centrifuge. The discharge opening for the parting liquid is situated next to the discharge opening for the floating material, likewise at an end of the centrifuge.

What is disadvantageous with separating device disclosed by U.S. Pat. No. 2,528,974 relates to the design of the discharge means which, due to the opposite coiling of the screw conveyors, leads to undesirable turbulances in the parting liquid, as well as the misplaced discharge of floating matter at the sinks discharge, caused by the proximity of the admission opening for the ore suspension relative to the discharge opening for the sinks.

SUMMARY OF THE INVENTION

It is an object of the invention to provide an apparatus and a method for wet-mechanical separation of solids based on their density in a centrifugal field that, given high separating power, reduces the described disadvantages of the previously known method.

An embodiment of the invention utilizes an apparatus for the wet-mechanical separation of solids according to their density by placing a suspension of solids in a parting fluid under the influence of a centrifugal field. A rotating container is provided with openings for the admission of solids to be separated as well as for the discharge of the separated solids and the parting fluid. A discharge means, preferably in the form of a rotating screw conveyor, is positioned within the container. To achieve the stated object, a diaphragm plate is arranged axially between the admission opening and a discharge opening for the dense particles or sinks to prevent the less dense particles or floats from being discharged with the sinks. A discharge opening for the parting liquid is arranged axially between the diaphragm plate and the discharge opening for the sinks. Further, the radial spacing of the outside edge of the diaphragm plate from the axis of the rotating container is greater than the radial spacing of the parting liquid discharge opening from the axis of the rotating container.

As a result of the arrangement of the discharge means with the diaphragm plate that spatially separates the region of the sinks discharge from the region of the floats discharge and including arranging the diaphragm plate between the admission opening and the discharge opening for the sinks, a complete separation of the floats from the sinks is achieved. Due to the placement of the parting liquid discharge opening in the discharge region for the sinks, the floats are also prevented from being discharged along with the parting liquid. Due to the different and separate coiling of the discharge means within the regions separated by the diaphragm plate, a relatively turbulent free conveying of the separated solids toward the discharge openings is enabled.

It is also possible in a further development of the invention to drive the two helices of the discharge means with different rotational speeds in order to be able to optimally implement the separation of floats and sinks without losses of throughput and separating power even given different mass and volume relationships of sinks to floats.

It is also possible as a result of a further, advantageous development of the invention to clean the separated solids of adhering parting liquid by washing them with a suitable liquid after they are separated but before they are completely discharged from the separating means. To this end, the discharge device is provided with admission openings for the introduction of a washing liquid and the outer generated surface of the rotating container of the separating means is fashioned as a sieve immediately upstream of the solids discharge outlet. The parting liquid diluted and displaced by the wash liquid passes through the sieve openings and is then discharged, separated from the remaining parting liquid by means of appropriately arranged outlet conduits.

During operation of the separating means, high centrifugal accelerations in excess of about 300 g, and preferably more than 800 g, exert extreme forces on the solids particles. These forces act radially inward or radially outward dependent on the density of the solids particles. Thus, not only are the solids separated from one another in this way, but superfine-grained dirt that may potentially adhere to the surfaces of the solids particles is also separated from the solids particles. The parting liquid is also largely freed of floating particles, so that clean parting fluid is available for recirculation. Undesired circulations of superfine floating particles therefore do not result that otherwise could change the density of the parting fluid. Therefore, higher levels of purity of the separated products can be achieved than were previously achievable with mechanical methods.

In a further development of the invention, it is also possible, particularly when separating plastics whose differences in density are extremely slight, to implement the separating process at a temperature above the melting point of one of the plastics, so that the melt that is formed acts as the parting liquid. The molten plastic is then discharged in an especially pure form, whereas the other plastics are discharged as sinks or floats dependent on their density. Since the melts that are formed often have high viscosity, the inventive application of high centrifugal forces is also advantageous in these cases. Therefore, the method of the invention can be used for separating plastics from mixtures of used plastics that originate from household waste, commercial waste, electronic scrap, automotive scrap in the form of coarse pieces and/or in the form of films and/or granules and, for example, container plastics of polyvinylchloride, polyethylene, polypropylene, polystyrol, etc. The individual plastics or groups of plastics will be discharged from the separating device as floats or sinks dependent or their density with the assistance of a suitable parting liquid whose density lies between the densities of the plastics to be separated.

Exemplary devices of the invention shall be set forth in greater detail with reference to schematic figures of the drawing.

DETAILED DESCRIPTION OF THE PREFERRED EMBODIMENTS

Figure 1:
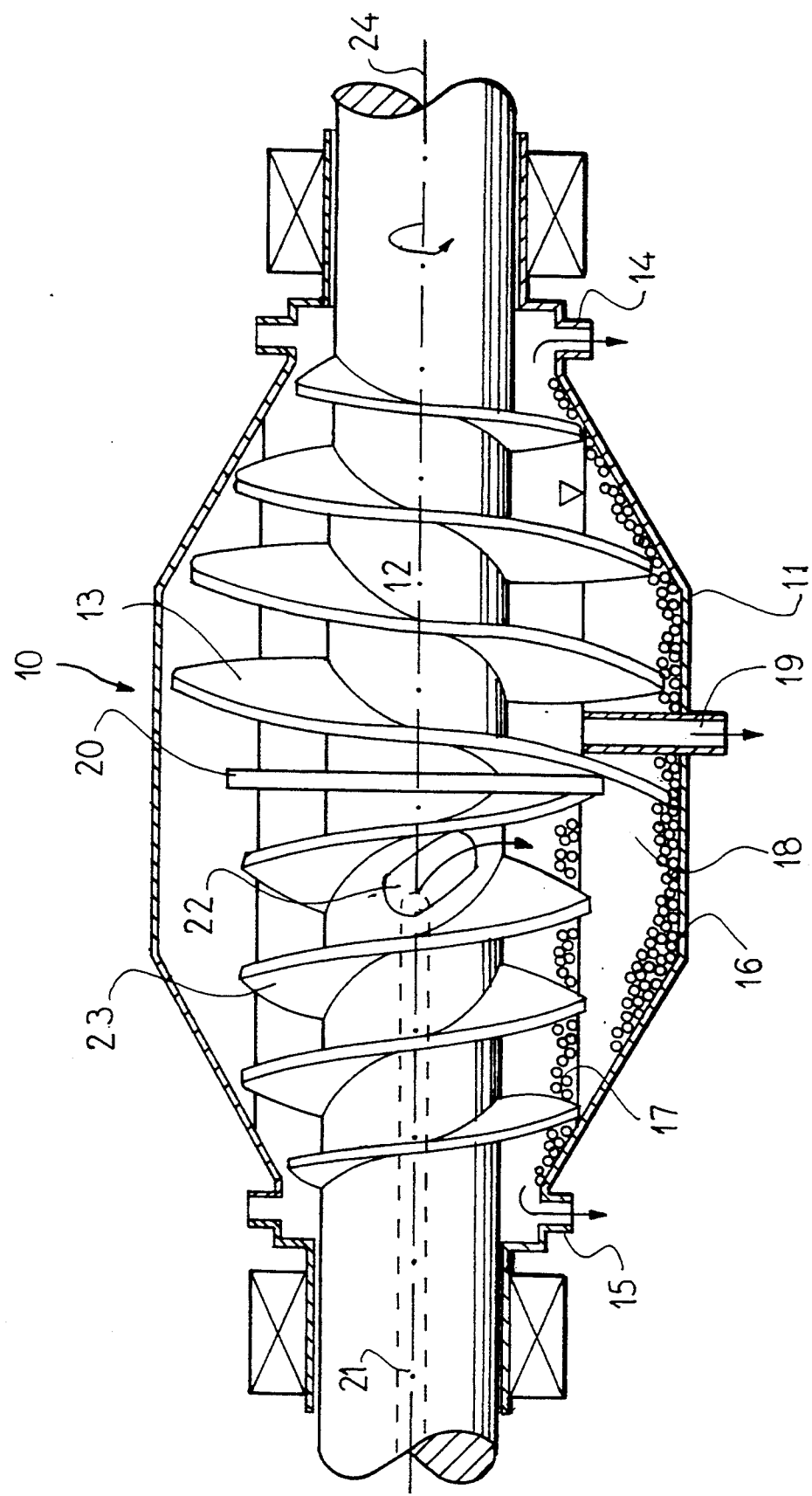
FIG. 1 is a schematic, longitudinal sectional view through a separating device fashioned as a worm centrifuge.

As illustrated in FIG. 1, a separating device 10 is composed of a cylindrical container 11 that is conical at both ends. A discharge means in the form of a two-part conveyor screw 12 having screw helices or flights 13 for the discharge of sinks (higher density solids) 16 and having screw helices or flights 23 for the discharge of the floats (lower density solids) 17 is situated inside the container 11. Due to the differing designs of the screw helices (outside diameter and oppositely directed helices), the sinks 16 and the floats 17 are conveyed to oppositely arranged discharge openings 14, 15; the sinks 16 to one or more discharge openings 14, the floats 17 to one or more discharge openings 15. The parting liquid 18 separated from the sinks and from the floats is discharged by means of one or more nozzles 19 in the middle of the separating device 10. A diaphragm plate 20 prevents the floats 17 from being entrained by the helices 13 for the sinks 16 during the separating process.

During operation of the separating device 10, the suspension formed of the solids 16, 17 to be separated and of the parting liquid 18 is delivered into the interior of the container through one or more openings 22 arranged in the worm jacket through an axially arranged delivery pipe 21. Due to rotation of the container 11 and the conveyor screw 12, whereby the conveyor screw is driven with a speed differing from the container speed, the suspension is placed in rotation and adopts a cylindrical shape along the outer wall of the container 11. A centrifugal field is thereby generated in the suspension. As a consequence of the difference in density of the various solids and the parting liquid, as well as a consequence of the acting centrifugal force, a separation of these solids occurs in an extremely short time, whereby the lightweight solids (floats 17) move to the radially inward surface 18a of the parting liquid 18 and the heavy solids (sinks 16) sink to the outer generated surface 11a of the container 11. The floats 17 are then engaged by the worm helices 23 and are conveyed to the discharge opening 15. The sinks 16 are engaged by the worm helices 13 and are lifted out of the parting liquid and conveyed to the discharge opening 14 as a consequence of the conical shape of the outer generated surface of the container 11.

Alternatively to admission as a suspension, the solids can also be introduced into the interior of the container with a conveyor means (for example, a feed screw), so that the solids are mixed with the parting fluid only within the container and immediately before the separation occurs. In this case, the parting fluid discharged with the solids is replenished by a separate delivery of parting liquid.

In this first embodiment of the separating device, the admission of the suspension or, respectively, the admission of the solids advantageously is directed onto a layer of floats 17 that already is present in the separating device, as a result whereof the floats 17 are swirled again and are freed of adhering sinks or of air bubbles. However, it is also possible to radially lengthen the delivery pipe such that it extends into the layer of parting liquid 18 when properties of the suspension or of the solids require this.

In a further embodiment, it is also possible to separately drive the two oppositely running screw members in order to achieve different speeds permitting a variable output ratio of sinks versus floats.

It is also possible in a further development of the invention to subject the solids separated from one another to a washing immediately before they are discharged.

Figure 2:
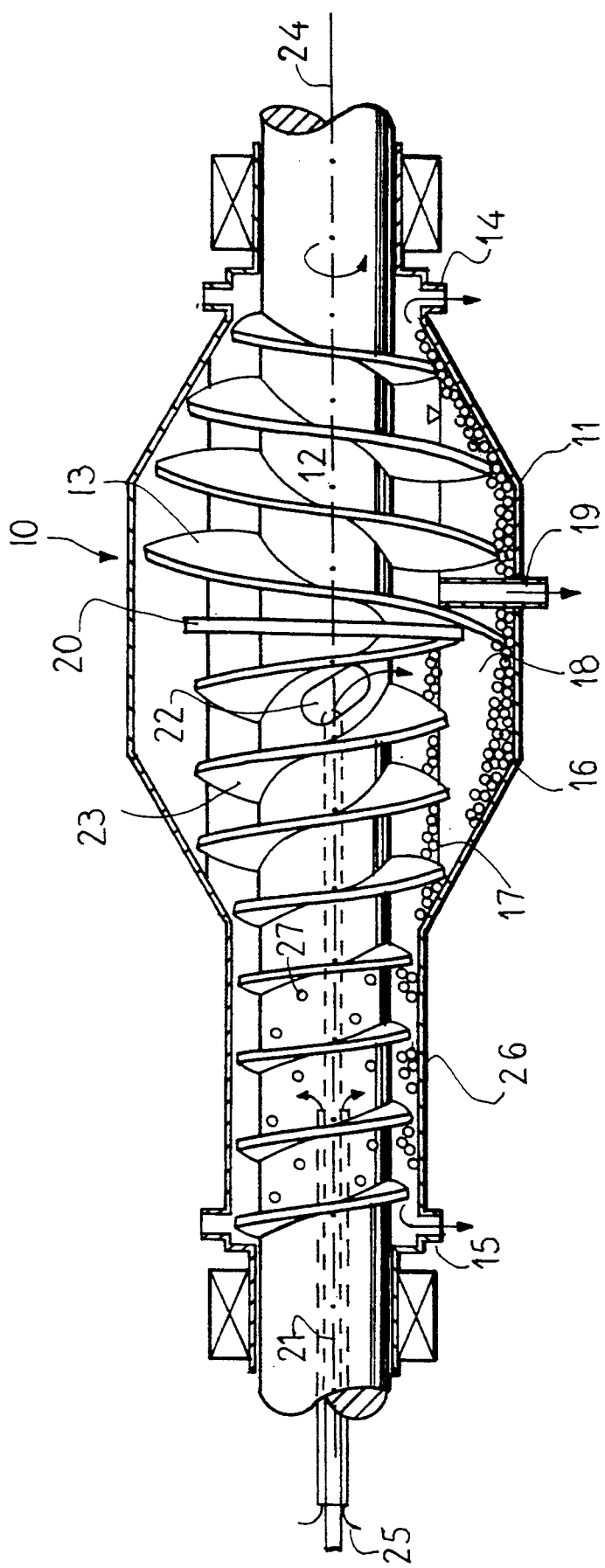
FIG. 2 is a schematic, longitudinal sectional view through a separating device fashioned as a worm screen-type centrifugal machine.

As shown in FIG. 2, the container 11 of the separating device 10 is lengthened for purpose of washing of the solids by a cylindrical sub-section at the discharge side for the floats in comparison to the parting device of FIG. 1. The generated outer surface of this sub-section is fashioned as a sieve 26.

The delivery of the wash liquid is provided by a pipe 25 that surrounds the axially arranged delivery pipe 21 and is accomplished by openings 27 in the screw jacket.

In the embodiment shown in FIG. 2, only the floats 17 are moved by the screw helices 23 along the sieve surface portion of the container 11 and are thereby mixed with wash liquid, whereas the sinks 16 are discharged from the separating device 10 untreated.

According to the invention, however, it is also possible to form the discharge side for the sinks 16 similarly to that shown in the example of FIG. 2, so that the sinks can also be washed, particularly when further, following separating units having different parting liquids require this.

In the illustrated exemplary embodiments, the floats and the sinks are discharged at opposite ends of the container 11. However, it is also possible to implement the discharge of the solids through different openings at only one end of the container on the basis of an appropriate redesign of the separating device, particularly of the screw conveyor member. Given corresponding properties of the substances to be separated as well as a property of the suspension resulting therefrom, a separating device of the invention is also possible wherein only the screw member or other internal component parts rotate and the outer container remains at rest.

In the illustrated exemplary embodiment, the parting liquid is discharged through one or more nozzles. These can be fashioned stationary or adjustable. However, it is also possible to discharge the liquid by means of stationary or adjustable peeler discs or peeler pipes.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

We claim as our invention:

1. An apparatus for the wet-mechanical separation of solids within a parting liquid into floats and sinks according to their density comprising:
a container provided with at least one opening for the admission of said solids to be separated and at least one separate opening for the discharge of said sinks, at least one separate opening for the discharge of said floats and at least one separate opening for the discharge of said parting liquid;
means for imparting a centrifugal force about an axis on said solids and parting fluid within said container;
a discharge means for separating said solids arranged in said container comprising a screw conveyor with a set of helices for engaging said floats and another set of helices for engaging said sinks;
a diaphragm plate arranged axially between the admission opening for said solids to be separated and said discharge opening for said sinks;
said screw conveyor being divided such by said diaphragm plate that one part of said screw conveyor conveys said sinks to said sinks discharge opening with its helices and another part of said screw conveyor conveys said floats to said floats discharge opening with its helices;
said discharge opening for said parting liquid arranged axially between said diaphragm plate and said discharge opening for said sinks;
a radial dimension of an outside edge of said diaphragm plate from an axis of said container being greater than a radial spacing of said discharge opening for said floats from said axis of said container; and
a radial dimension of an outside edge of said helices for engaging said sinks being greater than a radial dimension of an outside edge of said helices for engaging said floats.

2. An apparatus according to claim 1, wherein said two parts of said screw conveyor separated by said diaphragm plate are driven at different rotational speeds.

3. An apparatus according to claim 1, wherein said means for imparting a centrifugal force comprises means for rotating said container.

4. An apparatus according to claim 1, wherein said means for imparting a centrifugal force comprises means for rotating said discharge means.

5. An apparatus according to claim 1, wherein said means for imparting a centrifugal force comprises means for rotating said container and said discharge means.

6. An apparatus for the wet-mechanical separation of solids within a parting liquid into floats and sinks according to their density comprising:
a container provided with at least one opening for the admission of said solids to be separated and at least one separate opening for the discharge of said sinks, at least one separate opening for the discharge of said floats and at least one separate opening for the discharge of said parting liquid;
means for imparting a centrifugal force about an axis on said solids and parting fluid within said container;
a discharge means for separating said solids arranged in said container;
a diaphragm plate arranged axially between the admission opening for said solids to be separated and said discharge opening for said sinks;
said discharge opening for said parting liquid arranged axially between said diaphragm plate and said discharge opening for said sinks;
a radial dimension of an outside edge of said diaphragm plate from an axis of said container being greater than a radial spacing of said discharge opening for said floats from said axis of said container; and wherein an outer surface of said container is fashioned as a sieve upstream of at least one of said discharge opening for said floats and said discharge opening for said sinks, and at least one opening for introduction of a wash liquid into said container is arranged in this region.

7. A method for the wet-mechanical separation of solids within a parting fluid into floats and sinks according to their density comprising the steps of:
providing a rotatable container having at least one opening for the admission of said solids to be separated and at least one separate opening for the discharge of said sinks, at least one separate opening for the discharge of said floats and at least one separate opening for the discharge of said parting liquid;
providing a rotatable discharge means for separating said solids within said container comprising a screw conveyor with one set of helices for engaging said floats and another set of helices for engaging said sinks;
arranging a diaphragm plate axially between said admission opening for said solids to be separated and said discharge opening for said sinks;
dividing said screw container by said diaphragm plate such that one part of said screw conveyor conveys its sinks to said sinks discharge opening with its helices and another part of said screw conveyor conveys said floats to said floats discharge opening with its helices;
arranging said discharge opening for said parting liquid axially between said diaphragm plate and said discharge opening for said sinks;
radially dimensioning an outside edge of said diaphragm plate from an axis of said rotating container at distance greater than a radial dimension of said floats discharge opening from said axis of said rotating container;
radially dimensioning an outside edge of said helices for engaging said sinks at a distance greater than a radial dimension of an outside edge of said helices for engaging said floats; and
rotating said container at a speed sufficiently high so that a centrifugal acceleration in the range of at least 300 g to 800 g is present in the region of the greatest radial spacing of an outer generated surface of said container from its axis.

8. A method according to claim 7, wherein said solids comprise mixtures of used plastics whereby individual plastics or groups of plastics are discharged from said separating device as floats or as sinks dependent on their density with the assistance of a suitable parting liquid whose density lies between the densities of the plastics to be separated.

9. A method according to claim 8, wherein one of said plastics is converted into a melt by means of a thermal treatment and said melt is used as said parting liquid.

10. An apparatus for the wet-mechanical separation of solids within a parting liquid into floats and sinks according to their density comprising;
a container rotatable about an axis provided with at least one opening for the admission of said solids to be separated and at least one separate opening for the discharge of said sinks, at least one separate opening for the discharge of said floats and at least one separate opening for the discharge of said parting liquid;

a discharge means for separating said solids arranged in said container, said discharge means comprising a screw conveyor rotatable about said axis with one set of helices for engaging said floats and another set of helices for engaging said sinks;

a diaphragm plate arranged axially on said screw conveyor between said admission opening for said solids to be separated and said discharge opening for said sinks such that one part of said screw conveyor conveys said sinks to said sinks discharge opening with its helices and another part of said screw conveyor conveys said floats to said floats discharge opening with its helices;

said discharge opening for said parting liquid arranged axially between said diaphragm plate and said discharge opening for said sinks;

a radial dimension of an outside edge of said diaphragm plate from said axis of said rotatable container being greater than a radial dimension of said floats discharge opening from said axis; and a radial dimension of an outside edge of said helices for engaging said sinks being greater than a radial dimension of an outside edge of said helices for engaging said floats.

11. An apparatus according to claim 10, wherein said two parts of said screw conveyor separated by said diaphragm plate are driven at different rotational speeds.

12. An apparatus for the wet-mechanical separation of solids within a parting liquid into floats and sinks according to their density comprising:

a container rotatable about an axis provided with at least one opening for the admission of said solids to be separated and at least one separate opening for the discharge of said sinks, at least one separate opening for the discharge of said floats and at least one separate opening for the discharge of said parting liquid;

a discharge means for separating said solids arranged in said container, said discharge means comprising a screw conveyor rotatable about said axis with one set of helices for engaging said floats and another set of helices for engaging said sinks;

a diaphragm plate arranged axially on said screw conveyor between said admission opening for said solids to be separated and said discharge opening for said sinks such that one part of said screw conveyor conveys said sinks to said sinks discharge opening with its helices and another part of said screw conveyor conveys said floats to said floats discharge opening with its helices;

said discharge opening for said parting liquid arranged axially between said diaphragm plate and said discharge opening for said sinks;

a radial dimension of an outside edge of said diaphragm plate from said axis of said rotatable container being greater than a radial dimension of said float discharge opening from said axis; and wherein an outer surface of said container is fashioned as a sieve upstream of at least one of said opening for said floats and said discharge opening for said sinks, and at least one opening for introduction of a wash liquid into said container is arranged in this region.

* * * * *